United States Patent [19]

Nemoto et al.

[11] Patent Number: 4,893,792
[45] Date of Patent: Jan. 16, 1990

[54] COLD TRAP

[75] Inventors: Kiyomitsu Nemoto; Norikatsu Yokota, both of Hitachi; Yoshihiko Sato, Ibaraki; Shigehiro Shimoyashiki, Hitachi; Kenji Mokuya, Hitachi; Hiroshi Haino, Hitachi, all of Japan

[73] Assignee: Hitachi, Ltd., Tokyo, Japan

[21] Appl. No.: 268,759

[22] Filed: Nov. 9, 1988

[30] Foreign Application Priority Data

Nov. 16, 1987 [JP] Japan .................. 62-287330

[51] Int. Cl.$^4$ .................................... C21B 3/04
[52] U.S. Cl. ................... 266/227; 266/287
[58] Field of Search .......... 266/170, 227, 287; 75/66, 68 R; 376/312

[56] References Cited

U.S. PATENT DOCUMENTS 3,744,995 7/1973 Mackay .................. 266/170
3,831,912 8/1974 Shimoyashiki et al. ......... 75/66
4,291,865 9/1981 Grundy .................. 266/227

FOREIGN PATENT DOCUMENTS 61-66344 12/1981 Japan .
62-33729 2/1987 Japan .

Primary Examiner—S. Kastler
Attorney, Agent, or Firm—Antonelli, Terry & Wands

[57] ABSTRACT

This invention relates to a cold trap for collecting impurities from liquid, which comprises a mesh screen and a spacer mesh having higher strength and wider mesh holes than that of the mesh screen interposed between the windings of the mesh screen. According to the present invention, since the spacer mesh supports the mesh screen over the whole surface thereof so that the mesh screen is protected free from break or deformation, the stiffness and collecting efficiency of the mesh section can be maintained prolongedly.

16 Claims, 3 Drawing Sheets

COLD TRAP

BACKGROUND OF THE INVENTION

This invention relates to a cold trap, and more particularly, to a structure of a mesh section suitable for being used for a cold trap collecting impurities in liquid metal.

A mesh section incorporated in a conventional cold trap has a structure in which a mesh screen woven of fine metallic wire in a stockinette stitch state is corrugated and wound around a tubular member as disclosed in U.S. Pat. No. 3,831,912. In such mesh section, the surface of the mesh screen is located in a cold trap in such a manner that it is parallel to the flow of liquid sodium. Also, a mesh screen plain-woven of fine metallic wire is well known.

There is a cold trap such as described in Japanese patent application Laid-Open No. 56-166344 (166344/1981) (corresponding to U.S. Pat. No. 4,291,865) in which, in mesh bands in the cold trap, a mesh band of small mesh size is located at the inner side of the mesh bands defining an outlet for liquid and a mesh band of large mesh size is located at the outer side of the mesh bands which defines an inlet for liquid to be supplied, thereby flowing liquid metal radially from the outer side of the mesh bands to the inner side to collect impurities contained in the liquid metal by the mesh bands.

A cold trap shown in FIG. 1 of Japanese patent application Laid-Open No. 62-33729 (33729/1987) is also well known, in which mesh bodies are provided at multiple stages, and when the lower-stage mesh body is choked, liquid is flowed into the middle-stage mesh body to remove impurities in the liquid by the middle-stage mesh body, and further when the middle-stage mesh body is also choked, the liquid is flowed into the upper-stage mesh body to remove the impurities in the liquid by the upper-stage mesh body.

In all well-known instances above-mentioned, when differential pressure is created between an inflow port and outflow port of liquid sodium in the mesh section, displacement or break of the mesh screen often occurs. The conventional cold trap is ordinally designed so that the filling density of the mesh section is about 5-15% with respect to the capacity of the cold trap, and the effective rate of collecting impurities is about 10-30%. Such a small collecting effective rate is considered to resulted from the following causes.

That is, the impurities in the liquid sodium may be omnipresently collected through the mesh section at the inflow and outflow sides for the liquid sodium of the cold trap and a large amount of the impurities will be obtained at the beginning of operation of the cold trap. For this reason, the fluid resistance of the liquid sodium at the mesh section becomes large, which results in an increase of the differential pressure between the inflow and outflow ports for the liquid sodium of the mesh section. Accordingly, the mesh section is crushed in the direction of the flow of the liquid sodium, and a portion of the mesh section is closedly in contact with the adjacent portion thereof so as to make the flow of Na uneven. The portion of the mesh section is plastically deformed by the break thereof so that the primary efficiency cannot be maintained. The collecting efficiency of impurities is thus decreased. Also, it is difficult to regenerate the cold trap and the primary efficiency cannot be recovered.

SUMMARY OF THE INVENTION

This invention aims to provide a structure of a mesh section of a cold trap having a sufficient stiffness free from break and plastic deformation.

In order to attain such object, according to the present invention, there is provided a cold trap in which a mesh screen and a spacer mesh having higher strength and wider mesh holes than that of the mesh screen are contained within a shell through which liquid passes, each of the meshes being disposed so that surfaces of the respective meshes intersect the flow of the liquid, and the spacer mesh extends at a location of an inflow surface through which the liquid is delivered to an assembly of the mesh screen and the spacer mesh, and at a location of an outflow surface through which the liquid is discharged out of the assembly; and there is also provided a structure of the mesh section for a cold trap, which structure is contained in the cold trap and located in such a manner that the surfaces of each of the meshes intersect the flow of liquid passing through the cold trap, in which the mesh screen and the spacer mesh having wider mesh holes and higher strength are provided volutely, the spacer mesh extending at the innermost and outermost peripheries in volute condition, and the mesh screen and the spacer mesh being superimposedly located throughout the windings.

DESCRIPTION OF PREFERRED EMBODIMENTS

Figure 1:
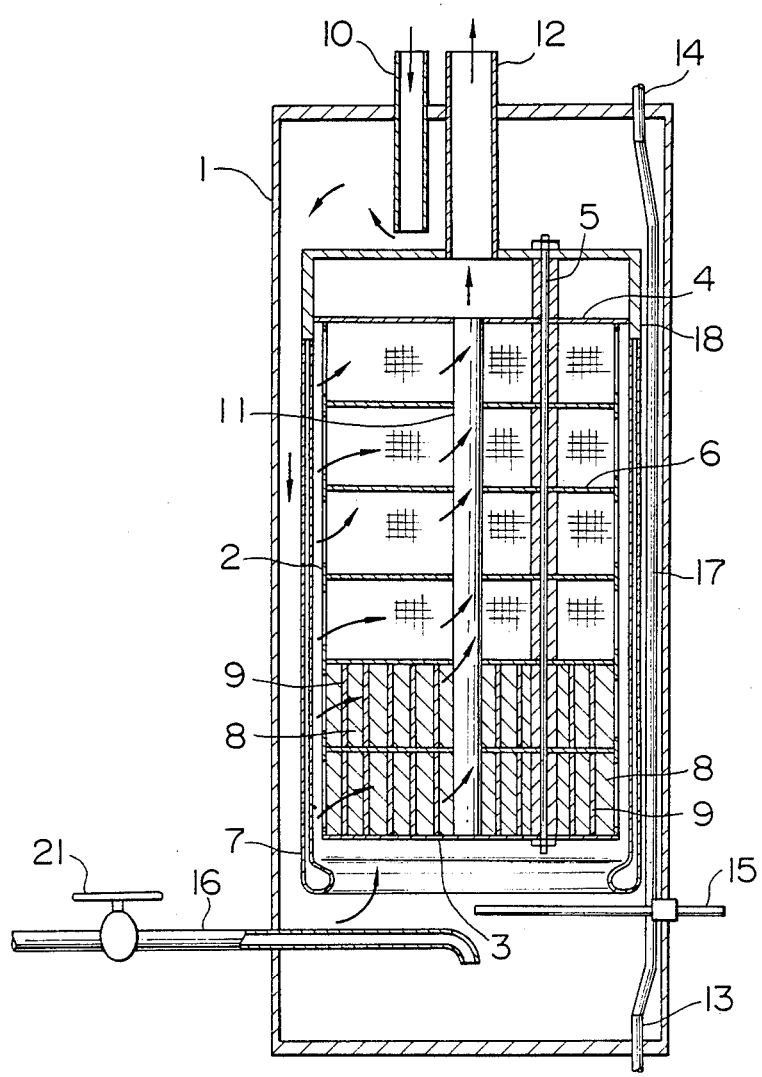
FIG. 1 is a vertical cross-sectional view of a cold trap according to one embodiment of this invention.

A cold trap illustrated in FIG. 1 provides such structure as will be described hereinafter.

Figure 2:
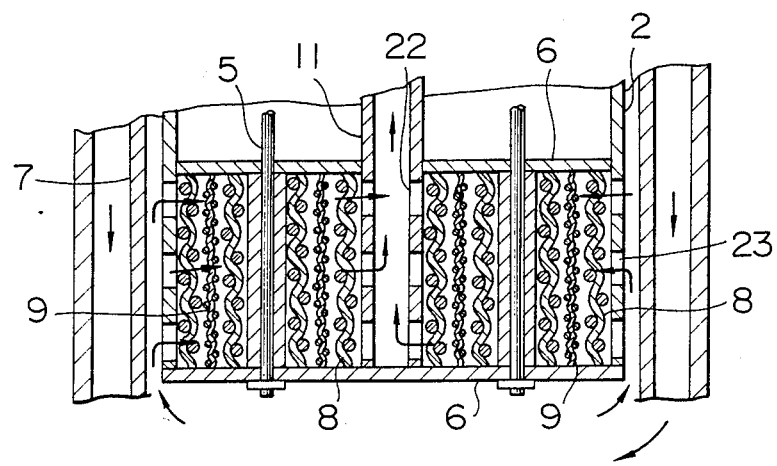
FIG. 2 is an enlarged view of a mesh section in FIG. 1.

An inlet pipe 10 and an outlet pipe 12 are secured to the upper portion of an outer shell 1. A lid 18 for covering the upper portion of heat insulation means 7 is connected to the outlet pipe 12. The cylindrical heat insulation means 7 charged with insulating gas is secured to the lower portion of the lid 18. Located inside the heat insulation means 7 are a pipe 11 with a plurality of fluid discharge ports 22 (see FIG. 2) on the outer periphery, a spacer mesh 8 and a mesh screen 9 which are wound around the pipe 11. The respective meshes 8, 9 are separated into several sections lengthwise by partition plates 6. The upper sides of the respective uppermost meshes 8, 9 are closed with an upper flat plate 4, and the lower sides of the respective lowermost meshes 8, 9 and the lower end of the pipe 11 are also closed with a lower flat plate 3. An inner shell 2 is fixed to the upper flat plate 4 or some portion so that it contains the respective meshes 8, 9 and the partition plates 6. The outer periphery of the inner shell 2 is provided with a plurality of fluid intake ports 23 (see FIG. 2). Tie rods 5 extend from the lid 18 to clamp the respective meshes 8, 9, the pipe 11, the partition plates 6, and the upper and lower flat plates 3, 4. The reference numeral 17 designates a cooling pipe passing lengthwise through the pipe passageway between the outer shell 1 and heat insulation means 7. An outlet pipe 14 is connected to the upper end of the cooling pipe 17 and an inlet pipe 13 is connected to the lower end thereof. The respective pipes 13, 14 extend out of the outer shell 1. Cooling fluid coming from the inlet pipe 13 passes through the cooling pipe 17 while being expelled out of the outlet pipe 14. The reference numeral 15 is a thermometer for measuring the temperature of fluid, and the reference numeral 16 is a drainage pipe for exhausting a fluid which remains within the outer shell 1. A valve 21 is attached midway to the drainage pipe 16.

Figure 4:
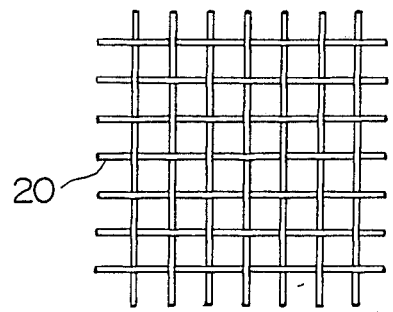
FIG. 4 is an enlarged view illustrating a portion of the woven mesh in FIG. 1.

As shown in FIG. 4, the spacer mesh 8 and the mesh screen 9 are formed in such a manner that metallic wires 20 are plain-woven. The mesh size of the spacer mesh 8 is taken as from 5 mesh to 20 mesh and that of the mesh screen 9 is taken as from 50 mesh to 100 mesh. Accordingly, the mesh size of the spacer mesh 8 is taken larger than that of the mesh screen 9. In addition, the respective woven meshes 8, 9 may be corrugated. The diameter of the wire 20 of the spacer mesh 8 is from 1 mm $\phi$ to 1.6 mm $\phi$ and the diameter of the wire 20 of the mesh screen 9 is from 0.1 mm $\phi$ to 0.5 mm $\phi$. Nickel, any other material plated with nickel, or pure iron may be used for a material of the wire 20. It is possible to collect radioactive corrosion products, carbon, hydrogen or nitrogen contained within liquid sodium as well as sodium oxide ($Na_2O$) by the material selected for the wire 20. The materials of the spacer mesh 8 and the mesh screen 9 may be chosen to differ from each other.

Figure 3:
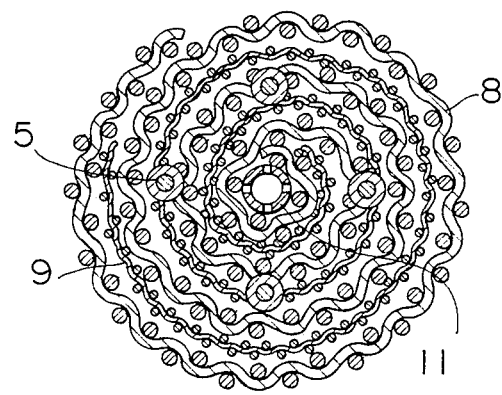
FIG. 3 is a horizontal cross-sectional view of the mesh section in FIG. 2.

The spacer mesh 8 and the mesh screen 9 are provided volutely around the pipe 11, as shown in FIG. 3. The spacer mesh 8 is wound around the pipe 11 so as to bring an initial course of one wind of the spacer mesh 8 into contact with the periphery of the pipe 11, and the spacer mesh 8 and the mesh screen 9 are simultaneously wound around the pipe; the mesh screen 9 being thus situated inside and the spacer mesh 8 being situated outside during the next winding. In this way, the spacer mesh 8 is arranged to be located on the innermost and outermost peripheries of the mesh assembly.

The operation of the cold trap is carried out in the following successive manner.

First, liquid sodium which has been heated at the temperature of more than 300° C. will be circulated through the purification system about for five hours for establishing uniformity in the temperature of the liquid sodium purification system including the cold trap and for improving "wetting" of the purification system.

Next, a desired purity of the liquid sodium is predetermined and the time required for attaining the purity is calculated from the amount of the liquid sodium to be processed, and then the temperature in the cold trap is gradually lowered to the target temperature, normally at the rate of 5° C. per minute.

The temperature in the cold trap is controlled uniformly, so that the impurities in the liquid sodium are uniformly collected in the mesh section of the cold trap.

The collection of the impurities in the liquid sodium will be concretely described as follows.

In the cold trap of FIG. 1, the liquid sodium flows into the upper portion of the outer shell 1 from the inlet pipe 10, and it flows downwardly between the outer shell 1 and the heat insulation means 7. The flowing liquid sodium is cooled by cold fluid passing within the pipe 17 and directed to the lower portion of the outer shell 1. Oxygen supersaturated in the liquid sodium (which will be described as an example, though hydrogen as well as oxygen and so on are impurities) is deposited as particles of sodium oxide ($Na_2O$) while cooling the liquid sodium. The deposited sodium oxide particles flow upwardly together with the liquid sodium to flow into the space between the heat insulation means 7 and the inner shell 2. The passageway between the heat insulation means 7 and the inner shell 2 is closed by the upper flat plate 4 at its upper end. For this reason, most of the liquid sodium having flowed in the passageway between the heat insulation means 7 and the inner shell 2 first flows into the uppermost spacer mesh 8 and the mesh screen 9 through the intake ports 23. The sodium oxide particles existing in the liquid sodium are filtered through the respective meshes 8, 9, or grow surrounding the cords of the respective meshers 8, 9, whereby they are uniformly collected by the respective meshes.

When a predetermined amount of the sodium oxide particles has been collected on the uppermost mesh portion in the above-mentioned manner, most of the liquid sodium flows into the second-stage mesh portion, because in the difference of the pressure loss between the liquid sodium intake and discharging ports with respect to the uppermost mesh portion and the pressure loss between the liquid sodium intake and discharging ports with respect to the secondary mesh portion; a predetermined amount of impurities are collected here in the same way as the first-stage mesh portion. Further, the liquid sodium successively flows into the lower-stage mesh portions into the third or fourth-stage mesh portion, and a predetermined amount of impurities are collected at the respective stage mesh portions of the cold trap.

The liquid sodium flowing in through the outermost periphery of the respective stage mesh portions and out of the innermost periphery thereof flows into the pipe 11 through the discharging ports 22. The liquid sodium within the pipe 11 flows upwardly into the outlet pipe 12 through the upper end of the pipe 11 is discharged out of the cold trap under the such that the impurities are decreased.

In the case of regeneration of the cold trap, the impurities in the mesh section are dissolved in the liquid sodium by means of heat of a heater located on the outer periphery of the outer shell 1 (not shown), or heat given to the inside of the cold trap by flowing gas at high temperature into the cooling pipe 17 and the respective pipes 13, 14. Argon gas (Ar) is fed into the inner shell 2 via the outlet pipe 12 under a high pressure, and the liquid sodium containing the dissolved impurities can be expelled out of the outer shell 1 through the pipe 16 when the valve 21 is opened. In this way, the impurities are separated from the mesh section, which is regenerated to a mesh section having no impurities adhered thereto. Such regeneration brings the mesh section in the cold trap into the state that choking caused by the impurities is reduced, and the impurities can be collected again.

The strength of the spacer mesh 8 is greater than that of the mesh screen 9 because the wire forming the spacer mesh 8 is thicker than the same forming the mesh screen 9. Since the mesh screen 9 is interposed between the spacer meshes 8, the mesh body assembled with the spacer meshes 8 and mesh screens 9 will be difficult to be broken by the pressure of the liquid sodium and the plastic deformation of the respective meshes 8, 9 does not occur easily, whereby the collecting amount of the impurities is increased, and the primary collecting efficiency can be maintained for a long time so that the regeneration ability is highly maintained. Accordingly, the life span of the collecting portion is prolonged.

At the outermost and innermost peripheries of the assembly of the respective meshes 8, 9 opposite to the intake and discharging ports of the liquid sodium, the spacer meshes 8 having large meshes are provided, so that there is a little possibility that the outlets and inlets are locally choked with the impurities, and thus the liquid sodium flows easily into the mesh section uniformly. Accordingly it is not probable that the mesh section will be exposed to large local pressure or be broken thereby.

A method of utilizing two combined spacer meshes and one fine-wire mesh screen in the ratio of two to one, or another one of the reverse combination may be adopted as the construction of the mesh section.

As mentioned above, since the mesh section collecting materials is constructed in such a manner that the meshes 9 and spacer meshes 8 are combined, a break or plastic deformation can be prevented. In addition to that, the spacer meshes include large meshes so as to maintain the flow of the smooth liquid sodium so that break and deformation is reduced and the improvement of the collecting amount of the collecting portion and the regeneration ability can be obtained as the liquid sodium flows in the mesh section uniformly. Further, since the surfaces of the mesh section having the discharging and intake ports for the liquid sodium are provided with the spacer meshes, the local choking of the outlets and inlets are reduced. Besides, as the spacer meshes exhibit their setting strength due to their mesh-setting, the whole of the mesh section provided with the spacer meshes exhibits high strength, producing the condition that it is difficult to submit to the pressure of the fluid. Furthermore, it is possible to form the whole body of the mesh portion easily and quickly by overlapping the mesh screens and spacer meshes and winding them simultaneously.

Figure 5:
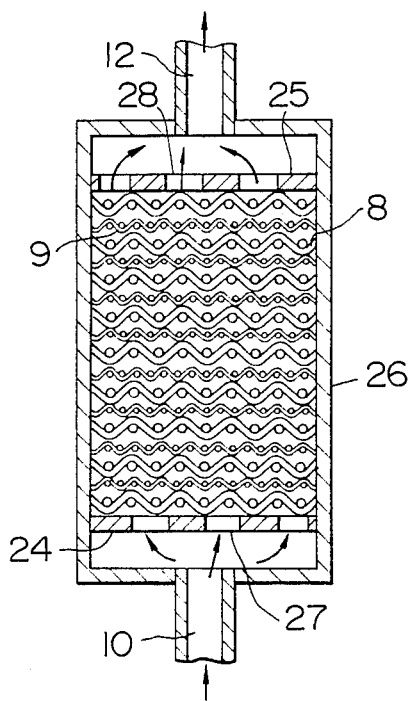
FIG. 5 is a vertical cross-sectional view of a cold trap according to a different embodiment of this invention.

A cold trap according to a different embodiment of the invention shown in FIG. 5 includes the following structure.

According to this embodiment, an inlet pipe 10 is connected to one end of a shell 26, and an outlet pipe 12 is connected to another end thereof. Spacer meshes 8 and mesh screens 9 are stacked alternately in the shell 26. The spacer meshes 8 are located at the uppermost and lowermost stages. The spacer meshes 8 and the mesh screens 9 may be corrugated. An assembly of the spacer meshes 8 and the mesh screens 9 is interposed between fixing plates 24, 25 in the shell 26 so that they may not be disjointed. It is preferable that these fixing plates 24, 24 are secured to the shell 26 so as not to slide. The fixing plate 24 is provided with a plurality of inlets 27, and the fixing plate 25 is provided with a plurality of outlets 28.

The spacer meshes 8 and mesh screens 9 are formed by plainly knitting metallic wire. The mesh size of the spacer mesh is taken as from 5 mesh to 20 meshes and the mesh size of the mesh screens is taken as from 50 mesh to 100 mesh. Accordingly, the mesh size of the spacer meshes 8 is taken larger than that of the mesh screens 9. The respective knitted meshes 8, 9 may be corrugated. The diameter of wire 20 for the spacer meshes 8 is from 1 mm $\phi$ to 1.6 mm $\phi$ and that of wire 20 for mesh screens 9 is from 0.1 mm $\phi$ to 0.5 mm $\phi$. Nickel, another material plated with nickel or pure iron can be utilized for the material of the wire 20. It is possible to collect radioactive corrosion products, carbon, hydrogen and nitrogen in the liquid sodium in addition to sodium oxide ($Na_2O$) by selecting the material of the wire 20. Also, the materials of the wires of the spacer meshes 8 and mesh screens 9 may differ from each other.

In such a cold trap, the liquid sodium to be purified and processed flows into the shell 26 from the inlet pipe 10, and thereafter flows into the respective meshes 8, 9 from the intake ports 27, whereby impurities in the liquid sodium are collected by the respective meshes 8, 9. The liquid sodium whose impurities are collected and purified flows out upwardly to be discharged outside the shell through the outlet pipe 12.

In the above-mentioned embodiment, the structure of the mesh section formed with the spacer meshes 8 and mesh screens 9 exhibits high strength and is scarcely choked similar to the former embodiment. Accordingly, it is possible to provide a cold trap whose collecting amount is large and life span is long.

What is claimed is:

1. A cold trap wherein at least one mesh screen and at least one mesh having higher strength and wider mesh holes than said at least one mesh screen are contained within a shell through which liquid passes, each of said meshes is disposed so that the surfaces of the respective meshes intersect the flow of said liquid, and said at least one spacer mesh extends at a location of an inflow surface through which said liquid is delivered to an assembly of said at least one spacer mesh and said at least one mesh screen, at a location of an outflow surface through which said liquid is discharged out of said assembly and in at least one position between adjacent parts of said at least one mesh screen.

2. A cold trap according to claim 1, wherein said at least one mesh screen and said at least one spacer mesh are corrugated.

3. A cold trap according to claim 1, wherein said at least one spacer mesh having higher strength and wider mesh holes than that of said at least one mesh screen is interposed between windings of said at least one mesh screen.

4. A cold trap according to claim 1, wherein said at least one mesh screen and said at least one spacer mesh having higher strength and wider mesh holes than that of said at least one mesh screen are overlapped to one another, and contained in a shell.

5. A cold trap according to claim 1, wherein said at least one mesh screen and said at least one spacer mesh having higher strength and wider mesh holes than that of said at least one mesh screen are contained in a shell with said at least one spacer mesh and said at least one mesh screen being overlapped to one another and wound volutely to form an assembly.

6. A cold trap according to claim 5, wherein said at least one mesh screen and said least one spacer mesh, which has higher strength and wider mesh holes than that of said at least one mesh screen and has a length longer than that of said at least one mesh screen, are overlapped to one another and wound volutely in such a manner that said at least one spacer mesh at least occupies first and last layers of the windings, and that said at least one spacer mesh and said at least one mesh screen are superimposedly provided throughout the windings.

7. A cold trap according to claim 5, wherein the assembly of the at least one mesh screen and the at least one spacer mesh is contained in a shell and divided into multiple stages by partition plates.

8. A cold trap according to claim 7, wherein at least one mesh screen and said at least one spacer mesh are wound around the outer periphery of a pipe including at least an outlet for liquid on the outer periphery, the outer periphery of the assembly of said at least one mesh screen and said at least one spacer mesh is surrounded by the inner shell including at least an inlet for liquid on the outer periphery, the inner shell is surrounded by an outer shell, the outer shell comprises an inlet pipe for introducing the liquid into the outer shell and an outlet pipe for discharging the liquid having passed through the inner shell out of the outer shell, cylindrical heat insulation means provided between the inner and outer shells to define gaps between the respective shells and itself, a cooling pipe extending through a location between the outer shell and the cylindrical heat insulation means, and a drainage pipe provided on the outer shell having an inlet opening at the lower portion within the space of the outer shell below the heat insulation means and an outlet leading outside of the outer shell.

9. A cold trap according to claim 1, wherein said at least one mesh screen and said at least one spacer mesh are plain-woven.

10. A cold trap according to claim 1, wherein said surfaces of said respective meshes are parallel to one another.

11. A cold trap according to claim 10, comprising a plurality of mesh screens and a plurality of spacer meshes, wherein each of said plurality of mesh screens alternates with each of said plurality of spacer meshes.

12. A cold trap according to claim 1, wherein said at least one mesh screen has a mesh size of 50 to 100 mesh, and said at least one spacer mesh has a mesh size of 5 to 20 mesh.

13. A cold trap according to claim 1, wherein said at least one mesh screen is woven of wire having a diameter of 0.1 mm to 0.5 mm, and said at least one spacer mesh is woven of wire having a diameter of 1 mm to 1.6 mm.

14. A cold trap according to claim 1, wherein said at least one mesh screen and at least one spacer mesh are woven of wire having a surface made of Ni.

15. A cold trap according to claim 1, wherein said at least one mesh screen and said at least one spacer mesh are woven of wire made of pure iron.

16. A structure of a mesh section of a cold trap, which mesh section is contained in the cold trap with their surfaces intersecting the flow of liquid in the cold trap, wherein a mesh screen and a spacer mesh having wider mesh holes and higher strength than that of said mesh screen are wound volutely to provide a volute assembly, said spacer mesh occupies at the innermost and outermost layers of the volute assembly, and said mesh screen and spacer mesh are superimposedly provided throughout said volute assembly.

* * * * *